(12) United States Patent
Boffa et al.

(10) Patent No.: US 10,458,883 B2
(45) Date of Patent: Oct. 29, 2019

(54) PROCESS AND APPARATUS FOR CONTROLLING TYRES, IN A PROCESS AND PLANT FOR MANUFACTURING TYRES FOR VEHICLE WHEELS

(71) Applicant: PIRELLI TYRE S.p.A., Milan (IT)

(72) Inventors: Vincenzo Boffa, Milan (IT); Maurizio Marchini, Milan (IT); Alessandro Held, Milan (IT); Riccardo Antoj, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 20 days.

(21) Appl. No.: 15/568,709

(22) PCT Filed: Apr. 18, 2016

(86) PCT No.: PCT/IB2016/052201
§ 371 (c)(1),
(2) Date: Oct. 23, 2017

(87) PCT Pub. No.: WO2016/174543
PCT Pub. Date: Nov. 3, 2016

(65) Prior Publication Data
US 2018/0143102 A1    May 24, 2018

(30) Foreign Application Priority Data
Apr. 30, 2015    (IT) .............................. MI2015A0616

(51) Int. Cl.
*G01M 17/02*    (2006.01)
(52) U.S. Cl.
CPC ........ *G01M 17/021* (2013.01); *G01M 17/022* (2013.01); *G01M 17/027* (2013.01)
(58) Field of Classification Search
CPC . G01M 17/021; G01M 17/022; G01M 17/027
See application file for complete search history.

(56) References Cited

U.S. PATENT DOCUMENTS

| 3,969,627 A | 7/1976 | Heisner et al. |
| 2008/0202229 A1 | 8/2008 | Maehner et al. |

(Continued)

FOREIGN PATENT DOCUMENTS

| DE | 10 2007 009 040 B3 | 5/2008 |
| DE | 10 2008 037 356 B4 | 2/2013 |

(Continued)

OTHER PUBLICATIONS

International Search Report from the European Patent Office in corresponding International Application No. PCT/IB2016/052201 dated Aug. 22, 2016.

(Continued)

*Primary Examiner* — Justin Seo
*Assistant Examiner* — Jean F Morello
(74) *Attorney, Agent, or Firm* — Finnegan, Henderson, Farabow, Garrett & Dunner, L.L.P.

(57) ABSTRACT

An apparatus and a process for controlling tires wherein the apparatus includes at least one control station which includes: a base; a rotating table mounted on the base so as to be able to rotate around a respective vertical rotation axis; at least one control device operatively active at the rotating table; and a movement device configured for rotating the rotating table around the vertical rotation axis. The rotating table has a substantially horizontal abutment portion configured for receiving and supporting a sidewall of a tire to be controlled. The abutment portion is movable in the horizontal plane according to two directions with respect to the vertical rotation axis by means of an actuator. A detection device is configured for detecting a shift between the vertical rotation axis and the main axis of the tire. An electronic management unit operatively connected to the detection device and to the actuator is configured for driving the actuator and moving the abutment portion according to the (Continued)

two directions as a function of the detected shift in order to render such shift less than a pre-established value, so as to center the tire with respect to the vertical rotation axis before executing the controls.

26 Claims, 8 Drawing Sheets

(56) References Cited

U.S. PATENT DOCUMENTS

| | | | |
|---|---|---|---|
| 2012/0134656 A1 | 5/2012 | Mizukusa et al. | |
| 2014/0270466 A1* | 9/2014 | Dam | G01M 17/027 382/141 |
| 2016/0252431 A1* | 9/2016 | Tachibana | G01M 17/021 73/146 |

FOREIGN PATENT DOCUMENTS

| | | |
|---|---|---|
| DE | 10 2013 102 296 A1 | 6/2014 |
| EP | 1 462 789 A1 | 9/2004 |

OTHER PUBLICATIONS

Written Opinion of the International Searching Authority from the European Patent Office in corresponding International Application No. PCT/IB2016/052201, dated Aug. 22, 2016.

* cited by examiner

PROCESS AND APPARATUS FOR CONTROLLING TYRES, IN A PROCESS AND PLANT FOR MANUFACTURING TYRES FOR VEHICLE WHEELS

CROSS REFERENCE TO RELATED APPLICATIONS

This application is a national phase application based on PCT/IB2016/052201, filed Apr. 18, 2016, which claims the priority of Italian Patent Application No. MI2015A000616, filed Apr. 30, 2015, the content of each application being incorporated herein by reference.

BACKGROUND OF THE INVENTION

Field of the Invention

The object of the present invention is a process and an apparatus for controlling tyres, in a process and in a plant for manufacturing tyres for vehicle wheels.

In particular, the present invention falls within the field of quality controls executed on tyres, preferably moulded and vulcanised, adapted to verify the compliance of the same to design specifications and hence allow sending tyres that are in compliance to storage and discarding defective tyres.

Description of the Related Art

A tyre for vehicle wheels generally comprises a carcass structure comprising at least one carcass ply having axially opposite end flaps engaged with respective anchoring annular structures integrated in the zones normally identified by the term "beads". The carcass structure is associated with a belt structure comprising one or more belt layers, situated in radial superimposition with respect to each other and with respect to the carcass ply. In radially external position with respect to the belt structure, a tread band is applied that is made of elastomeric material, like other semifinished products constituting the tyre. Respective sidewalls made of elastomeric material are also applied in axially external position on the lateral surfaces of the carcass structure, each extending from one of the lateral edges of the tread band up to the respective anchoring annular structure to the beads.

Following the building of the green tyre actuated by means of assembly of respective semifinished products, the production cycle terminates by executing a moulding and vulcanisation treatment aimed to determine the structural stabilisation of the tyre by means of cross-linking of the elastomeric material as well as impart, on the tread band, a desired tread design and at the sidewalls possible distinctive graphic marks. By the term "elastomeric material", it is intended a composition comprising at least one elastomeric polymer and at least one reinforcement filler. Preferably, such composition also comprises additives such as cross-linking agents and/or plasticising agents. Due to the presence of the cross-linking agents, such material can be cross-linked by means of heating, so as to form the final manufactured product.

By the term "controlling" referred to tyres, it is generically intended all those non-destructive operations that allow detecting possible external defects (on the radially external and/or radially internal surface) and/or internal defects (in the structure) of the tyre. Said controls can for example be of optical type (photography, shearography, holography, radiography, etc.), ultrasonic type, mechanical type or a combination thereof.

By the terms "lower", "upper", "bottom", "top", "below" and "above", the relative position with respect to the ground is identified of an element such as a component of a tyre, a tyre, an apparatus, a device, etc. or of one of said elements with respect to another.

By the term "half of the tyre", the axial halves of the tyre are intended, i.e. the halves delimited by an axial middle line plane orthogonal to the main rotation axis of the tyre and equidistant from the beads of the tyre itself.

By "at least one half of the tyre" it is intended a complete half as defined above plus possibly a further portion of the other half which is axially extended starting from the aforesaid middle line plane.

By "simultaneous advancing the tyres step-by-step" it is intended the simultaneous movement of a plurality of tyres placed along a path with a fixed pitch, at substantially constant time intervals.

By "building/production cycle time" it is intended the time that elapses from the exit of a built/finished tyre from the building/production line, and the exit of the subsequent tyre.

By "control cycle time" it is intended the time that elapses from the exit of a tyre controlled by the control apparatus and the exit of the subsequent tyre.

Preferably after vulcanisation, the tyres are subjected to quality controls in order to verify the possible presence of defects.

The document DE 10 2008 037 356 illustrates a system for testing tyres for the purpose of quality control and in order to reduce the risks tied to safety. Such tests allow the recognition of defective points. The system comprises a reading device for reading an identifier adapted to identify the tyre, a transport system provided with a plurality of transport sections for transporting the tyres along a transport direction, at least one test device and at least one control device adapted to control the reading device, the transport system and the test device. The transport system is provided with a plurality of sensors that detect the presence of a tyre in the transport sections. The control device is configured for recording the position of the tyre in the transport sections and for keeping track of the movement of the tyre itself. In one embodiment of such document, two test devices in sequence are illustrated, intended to test the tyres by means of different measurement methods.

The document EP 1 436 789 illustrates a method and a device for inspecting a tyre. The tyre to be inspected is first associated with a rim formed by two portions and inflated in an assembly station, then brought in sequence into multiple inspection stations where the tyre is rotated together with the rim while the inspection operations are executed, and then brought to a disassembly station where the tyre is deflated and the portions of the rim are removed therefrom.

The document US 2012/0134656 illustrates an illumination device and an inspection device for a tyre which are capable of detecting irregularities in the form of the tyre itself. A photographic device photographs the internal surface of the tyre while a guide device rotates the tyre and the inspection device with respect to each other around an axis of the tyre. Meanwhile, a light unit arranged along the peripheral internal surface of the tyre emits a light in a circumferential direction of the tyre itself. One embodiment of such document illustrates three successive inspection portions that are side-by-side, in which a tyre is brought in sequence by means of transport portions. The tyre lying in the first inspection portion is moved onto the rotating table of the second inspection portion, the tyre lying in the second inspection portion is moved onto the rotating table of the third inspection portion and the tyre lying in the third inspection portion is moved onto an outlet table.

The document U.S. Pat. No. 3,969,627 illustrates an automatic system for inspecting tyres which employs X rays in order to verify the integrity of portions of tyres fed in sequence along a feed path through a centering station and within a shielded casing in which an inspection station is defined. The tyres are fed one at a time onto a centering table, on which each tyre is laterally centred by means of a pair of arms. The tyre is then inserted in the shielded casing by making it advance on a conveyor, which is stopped when the axis of said tyre is situated along a predetermined line. Once in the inspection station, the casing is closed and a set of pins engage the beads of the tyre. The pins are rotated in order to rotate the tyre during the inspection with X rays.

SUMMARY OF THE INVENTION

In the field of automated systems for the inspection of tyres that exit from the production line, like those described above, the Applicant has observed that the time currently necessary for a complete and accurate control of every single tyre is not technically compatible with the high productivity of the current production lines (building and vulcanisation). This, in the current plants, signifies controlling all the tyres produced but foregoing part of the numerous controls or, alternatively, executing accurate controls only on some tyres (random controls).

In particular, the Applicant has observed that the known systems are not able to execute an accurate control of all the tyres in the times set by the building/production line, i.e. execute such controls in line without the tyres to be controlled being accumulated.

The Applicant has verified that the long control times of the known systems are at least partly ascribable to the complexity of the mechanisms and of the movement modes adapted to bring each tyre into one or more control stations and to manage said tyre and the control systems within each control station.

In particular, the Applicant has observed that one of the most critical features of the known devices is related to the positioning of the tyre with respect to the control systems so that the controls are executed in the correct manner. In the known systems, such positioning requires the intervention of complex, bulky mechanisms and devices that are relatively slow in relation to the times set by the building/production line.

The Applicant has also encountered that, due to that set forth above, the known automated systems are in some cases quite bulky in their entirety (see for example the document DE 10 2008 037 356), in other cases structurally complex and therefore expensive and not very reliable (such as those described in the documents US 2012/0134656, U.S. Pat. No. 3,969,627 and EP 1 436 789).

In such field, the Applicant has set the objective of controlling all the tyres exiting from the building/production line by optimizing the control times, in particular by executing all the controls with times and modes compatible with the building/production cycle time set by the same line, intended as time between the exit of one tyre from the building/production line and the exit of the subsequent tyre. The Applicant has also verified the need to execute such control by simultaneously limiting the size, the complexity and the costs of the apparatus dedicated thereto. The Applicant has also verified the need to execute such control on models of tyres that are even quite different from each other with regard to size (fitting, sidewall height, tread band width, etc.) and type (car/motorcycle/truck type, winter/summer tyre, self-sealing/run-flat tyre, etc.) without necessarily having to adapt the management mechanisms of said tyres each time the tyre model changes.

The Applicant has therefore perceived that by integrating, in a single device, the systems configured for loading, positioning/centering and rotating each tyre to be controlled, it was possible to meet the needs set forth above, in particular with regard to the compatibility with the building/production cycle time, to the reduction of the bulk of the movement and control apparatus, to the repeatability and reliability of the results and to the flexibility of the entire control system regarding each tyre model.

More precisely, the Applicant has found that the above-described needs can be satisfied by employing, in the control apparatus, a table adapted to receive a tyre in abutment and structured so as to be able to rotate around a vertical rotation axis thereof and be able to move the tyre in a plane with respect to the abovementioned rotation axis.

More specifically, according to one aspect, the present invention relates to an apparatus for controlling tyres, each tyre having a main rotation axis, said apparatus comprising at least one control station.

Preferably, said at least one control station comprises: a base.

Preferably, said at least one control station comprises a rotating table mounted on the base so as to be able to rotate around a respective vertical rotation axis.

Preferably, the rotating table comprises an abutment portion lying in a plane substantially horizontal and perpendicular to said vertical rotation axis and configured for receiving and supporting a sidewall of a tyre to be controlled.

Preferably, the abutment portion is movable in said plane that is substantially horizontal with respect to the vertical rotation axis according to two directions belonging to said substantially horizontal plane.

Preferably, said at least one control station comprises at least one control device operatively active at the rotating table.

Preferably, said at least one control station comprises a movement device configured for rotating the rotating table around said vertical rotation axis.

Preferably, said at least one control station comprises at least one actuator operatively connected to the abutment portion in order to move said abutment portion according to said two directions.

Preferably, said at least one control station comprises a detection device configured for detecting a shift on said substantially horizontal plane between the vertical rotation axis and the main axis of the tyre.

Preferably, said at least one control station comprises an electronic management unit operatively connected to the detection device and to said at least one actuator, wherein the electronic management unit is configured for driving the actuator and moving the abutment portion according to at least one of said two directions as a function of the detected shift in order to render such shift less than a pre-established value.

In accordance with a further aspect, the present invention relates to a process for controlling tyres, each tyre having a main rotation axis.

Preferably provision is made for feeding a tyre to be controlled onto an abutment portion lying on a substantially horizontal plane, said abutment portion belonging to a respective rotating table having a rotation axis substantially perpendicular to said substantially horizontal plane.

Preferably provision is made for detecting a shift on said substantially horizontal plane present between said vertical rotation axis of the rotating table and the main rotation axis of the tyre fed on said abutment portion.

Preferably provision is made for moving the abutment portion of said rotating table in said plane that is substantially horizontal with respect to the vertical rotation axis and according to at least one direction up to reducing said shift below a pre-established value.

Preferably provision is made for rotating the rotating table together with the tyre around said vertical rotation axis of the rotating table.

Preferably provision is made to execute controls on said tyre while the rotating table and the tyre are in rotation.

The Applicant deems that the apparatus for controlling and implementing the process according to the invention allow optimizing the control times and limiting the spaces dedicated for the control zone, with certain gain in terms of cost per produced tyre.

The Applicant in particular deems that the invention allows:
- carrying out all the necessary controls with extreme precision, rapidity and reliability;
- carrying out said controls with times and modes compatible with the building/production cycle time set by the building/production line placed upstream;
- limiting the size, the complexity and the costs of the apparatus dedicated to such controls, in particular of the mechanisms dedicated to the movement of the tyres in the apparatus.

The Applicant in particular deems that the integration of the various functions aimed to move the tyre in a single rotating table allows obtaining the above-listed objectives in a simple and effective manner.

The Applicant also deems that the invention allows executing such controls on models of tyres that are even quite different from each other (with regard to size and/or type) and to be able to pass quickly from one type to the other (also able to control models of tyres that will be developed in the future) without having to make changes to said apparatus such to stop/slow production. Indeed, the tyres are simply set with a sidewall thereof on the abutment portion and there are no further mechanical elements (such as arms, pins, etc.) that must engage the tyre in order to move it. The abutment portion is able to receive tyres of various types and sizes. The Applicant also deems that all these aspects positively affect the quality of the tyres that are produced and deemed compliant.

The present invention, in at least one of the aforesaid aspects, may have one or more of the preferred characteristics that are described hereinbelow.

Preferably, the electronic management unit is configured for centering the tyre with respect to the rotation axis, substantially cancelling said shift. In this manner, during the rotation of the rotating table, the tyre rotates around its main axis. In other words, the main rotation axis of the tyre remains fixed while the tyre rotates on itself. The circular symmetry of the tyre is exploited in order to limit, to a minimum, the number and complexity of the control devices which, preferably, are arranged in pre-established control positions while the tyre rotates.

Preferably, the detection device is of optical type. For example, said detection device comprises one or more cameras.

Preferably, the rotating table comprises an endless conveyor movable along a first direction of said two directions and carrying said abutment portion.

Preferably, the first direction corresponds with the direction along which the endless conveyor can be continuously moved.

Preferably, the abutment portion corresponds with an upper portion of the endless conveyor.

Preferably, said endless conveyor is also movable for a predefined travel along a second direction of said two directions.

Preferably, said two directions are orthogonal with respect to each other.

The first direction of the endless conveyor preferably defines both a centering direction and a transport and loading direction for the tyre on the rotating table.

Preferably, the second direction of the endless conveyor only defines a centering direction for the tyre.

In one embodiment, the endless conveyor comprises a conveyor belt wound on a pair of rollers, in which an upper surface of the conveyor belt defines the abutment portion.

Preferably, the first direction corresponds with the continuous movement direction of an upper branch of the conveyor belt which rotates along a closed path moved by the rollers. The use of the conveyor belt allows providing a continuous abutment surface for the tyre.

Preferably, said at least one actuator comprises a first actuator operatively connected to at least one of the rollers of said pair of rollers in order to make it rotate.

In a different embodiment, the endless conveyor comprises a plurality of powered rollers, in which the whole of the upper surfaces of said powered rollers defines said abutment portion.

Preferably, the first direction corresponds with the continuous movement direction of the upper surfaces of said rollers while they rotate around axes thereof.

Both of the above-described embodiments are simple and reliable.

Preferably, the rotating table comprises a rotating support rotatably coupled to the base around said vertical rotation axis.

Preferably, the endless conveyor is mounted on the rotating support and is movable with respect to said rotating support along the second direction.

Preferably, said at least one actuator comprises a second actuator operatively interposed between the rotating support and the conveyor in order to move it along the second direction.

Preferably, the apparatus comprises a plurality of control stations.

Preferably, the apparatus comprises a first control unit having an inlet for tyres and comprising at least one control device.

Preferably, provision is made for a second control unit having an outlet for the tyres and comprising at least one control device.

Preferably, provision is made for a transport and overturning device operatively interposed between the first control unit and the second control unit.

Preferably, said transport and overturning device is configured for overturning the tyre around an overturning axis belonging to an axial middle line plane of said tyre and perpendicular to said main rotation axis.

Preferably, the first control unit and the second control unit each comprise said at least one control station.

Preferably, the first control unit, the second control unit and the transport and overturning device define a control path configured so as to be traversed by each tyre step-by-step. At each step, a tyre is moved between one control station and the next or between one control station and the transport and overturning device.

Preferably, the first control unit and the second control unit coincide.

Preferably, the transport and overturning device is configured for overturning the tyre coming from the outlet of said control unit and in order to transfer it to the inlet of the same control unit by means of auxiliary transport devices.

In a different embodiment, the first control unit and the second control unit are separate and spatially placed in succession.

Preferably, the transport and overturning device is configured for overturning the tyre coming from the first control unit and in order to transfer it into the second control unit.

Preferably, the first control unit and the second control unit each comprise a plurality of control stations.

Preferably, between each control station and the next or between one control station and the transport and overturning device, a transfer group is placed comprising at least one transfer roller. The transfer group supports at least one portion of the sidewall of the tyre during its passage from one control station to a subsequent station (or from a control station to the transport and overturning device) and therefore prevents it from falling.

Preferably, said at least one transfer roller is powered. In addition to supporting, the transfer roller therefore actively cooperates in transporting the tyre along the control path.

Preferably, the transfer group comprises two or more auxiliary transfer rollers respectively placed downstream and upstream of the transfer roller.

Preferably, the transfer group is movable between a work position, in which it lies between one control unit and the next or between one control unit and the transport and overturning device in order to support the moving tyre, and a rest position, in which it allows the free rotation of the rotating table(s).

Preferably, the auxiliary transfer rollers are movable between a work position, in which they lie between one control unit and the next or between one control unit and the transport and overturning device in order to support the moving tyre, and a rest position, in which they allow the free rotation of the rotating table(s).

Preferably, in the rest position, the transfer group or the auxiliary transfer rollers is/are arranged in a lower position with respect to the rotating table.

In the work position, the transfer group or the auxiliary transfer rollers are placed at a distance, from each other and/or from the adjacent control units and/or the transport and overturning device, such to prevent the tyre from falling. Such distance however prevents the free rotation of the rotating table(s) during the execution of the controls. In the rest position, there is sufficient space around the rotating tables for preventing interference with the transfer group during the rotation thereof.

Preferably, at the end of the execution of said controls, provision is made for unloading said tyre from said abutment portion of said rotating table. The rotating table carries out both the function of loading and unloading tyres.

Preferably, said pre-established value is smaller than about 1 mm.

Still more preferably said pre-established value is equal to or less than about 0.1 mm. Such value is sufficient for ensuring the substantial centering of the tyre with respect to the rotation axis of the rotating table, i.e. the substantial coincidence between the rotation axis of the tyre and said rotation axis of the rotating table.

Preferably, since the tyres are not perfectly circular, the main rotation axis of each tyre is first calculated by means of suitably algorithms, not described herein.

Preferably, moving the abutment portion of the rotating table comprises: moving said abutment portion according to two directions on said substantially horizontal plane. Said shift can comprise only one component along the first direction, only one component along the second direction or, more realistically, one component along the first and one along the second direction. The movement of the abutment portion can therefore be single-dimensional (only in the first direction or only in the second direction) or two-dimensional (both in the first and in the second direction).

Preferably, the abutment portion is moved along the first direction for a first distance less than about 25 mm.

Preferably, the abutment portion is moved along the second direction for a second distance less than about 25 mm. The single-dimensional or two-dimensional movement of the abutment surface aimed for the centering is limited and therefore can be very precise.

Preferably, moving the abutment portion of the rotating table comprises: moving an endless conveyor carrying said abutment portion along a first direction of said two directions.

Preferably, moving the abutment portion of the rotating table comprises: moving the endless conveyor for a predefined travel along a second direction of said two directions.

Preferably, feeding the tyre comprises: loading said tyre on the rotating table by moving the abutment portion of said rotating table along a first direction of said two directions until the entire tyre rests on the rotating table. The movement of the transport surface along the first direction is used both for executing the centering of the tyre with respect to the rotation axis of the table and for loading the tyre on said table before executing the aforesaid centering. During loading, the rotating table is stopped (i.e. it does not rotate) and oriented in a manner such that the first direction is parallel to the control path.

Preferably, provision is made for pre-centering the tyre along the first direction.

Preferably, pre-centering along the first direction comprises: detecting the passage of the tyre during loading and stopping the movement of the abutment portion along the first direction after a predefined travel. In other words, during loading, the rotation axis of the tyre is already moved closer, along the first direction, to the rotation axis of the rotating table by executing a kind of pre-centering, which will be followed by the actual centering.

Preferably, the process comprises: pre-centering the tyre along the second direction.

Preferably, pre-centering along the second direction comprises: arranging the tyre on a mechanical centering support provided with two lateral sides before feeding it onto the rotating table.

Preferably, provision is made for simultaneously advancing, step-by-step, a plurality of tyres along a control path and executing controls on said tyres during time intervals placed between subsequent steps.

Preferably, at each time interval, provision is made to execute the steps from ii to v. Each control station is configured for centering the tyre. The centering in each station is opportune since the subsequent rotating tables might not be perfectly aligned with each other and since the tyre can slip in passing from one rotating table to the next. Preferably, for each of the tyres, provision is made for controlling at least one first half of the tyre by executing a plurality of controls along a first part of the control path, in which the first half is an axial half of the tyre delimited by an axial middle line plane.

Preferably, for each of the tyres, provision is made for overturning said tyre around an overturning axis belonging to said axial middle line plane and perpendicular to said main rotation axis after the exit from said first part of the control path.

Preferably, for each of the tyres, provision is made for conducting said tyre to the inlet of a second part of the control path.

Preferably, for each of the tyres, provision is made for controlling at least one second half of said tyre by executing the same plurality of controls along said second part of the control path, in which the second half is the other axial half of the tyre delimited by said axial middle line plane.

Preferably, advancing comprises: supporting each tyre between one rotating table and the next or between one rotating table and a transport and overturning device by means of a transfer group.

Preferably, provision is made for lowering the transfer group before rotating the rotating table in order to allow the free rotation of said rotating table.

Preferably, pre-centering the tyre along the second direction is executed at the start of the first part of the control path and/or of the second part of the control path. Each tyre arrives laterally pre-centred, i.e. along the second direction, on the first control station and is longitudinally pre-centred, i.e. along the first direction, during loading on said first control station.

Preferably, during the execution of the controls on said tyre carried out while the rotating table and the tyre are in rotation said at least one control device is maintained in pre-set fixed control positions.

Preferably, said control positions are pre-set as a function of the type of tyre to be controlled. The control devices are preferably spatially moved only to bring them into the abovementioned control positions. Each control device preferably acts in each instant on a circumferentially limited portion of the tyre. During the control, the control device is not moved; rather it is the tyre which slides in front of/below said device. The controlled zone during a complete revolution of the tyre is therefore an annular portion of said tyre. This selection considerably simplifies the management of the movement of the control devices and the management of the apparatus in its entirety.

Preferably, the control devices are carried by support and movement devices placed above the rotating table.

Preferably, the support and movement devices comprise at least one anthropomorphic robotic arm constrained to the upper portion of a frame. The anthropomorphic robotic arms ensure a high flexibility since, due to their numerous degrees of freedom and by means of their programming, it is possible for example to easily change the positions of the control devices during the controls, the sequence of the controls, etc.

Further characteristics and advantages will be clearer from the detailed description of a preferred but not exclusive embodiment of a process and of an apparatus for controlling tyres in a process and a plant for manufacturing tyres for vehicle wheels in accordance with the present invention.

BRIEF DESCRIPTION OF THE DRAWINGS

Such description will be set forth hereinbelow with reference to the enclosed drawings, provided only by way of a non-limiting example, in which.

DETAILED DESCRIPTION

Figure 1:
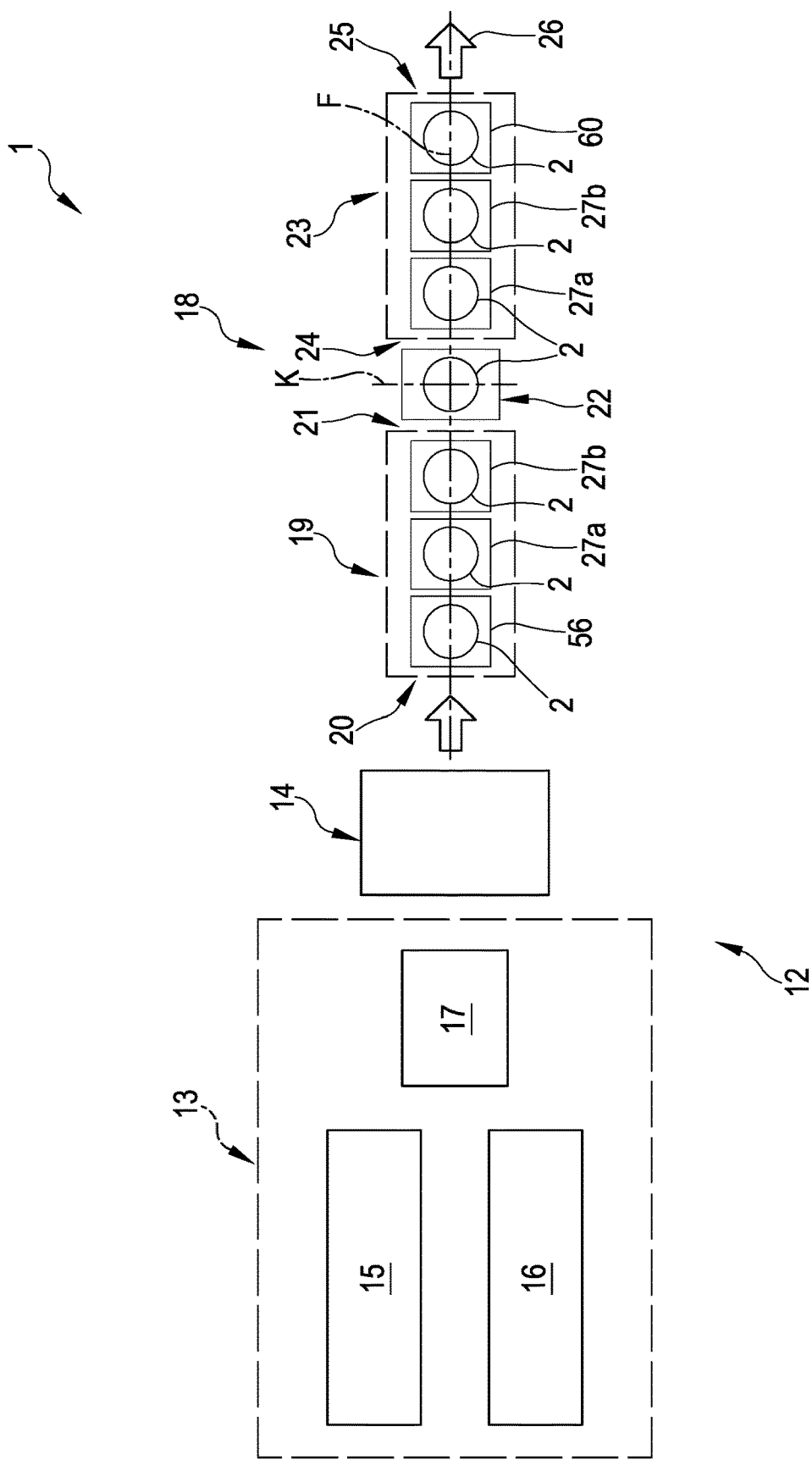
FIG. 1 schematically shows a plant for manufacturing tyres for vehicle wheels.

With reference to FIG. 1, reference number 1 overall indicates a plant for producing tyres for vehicle wheels.

Figure 9:
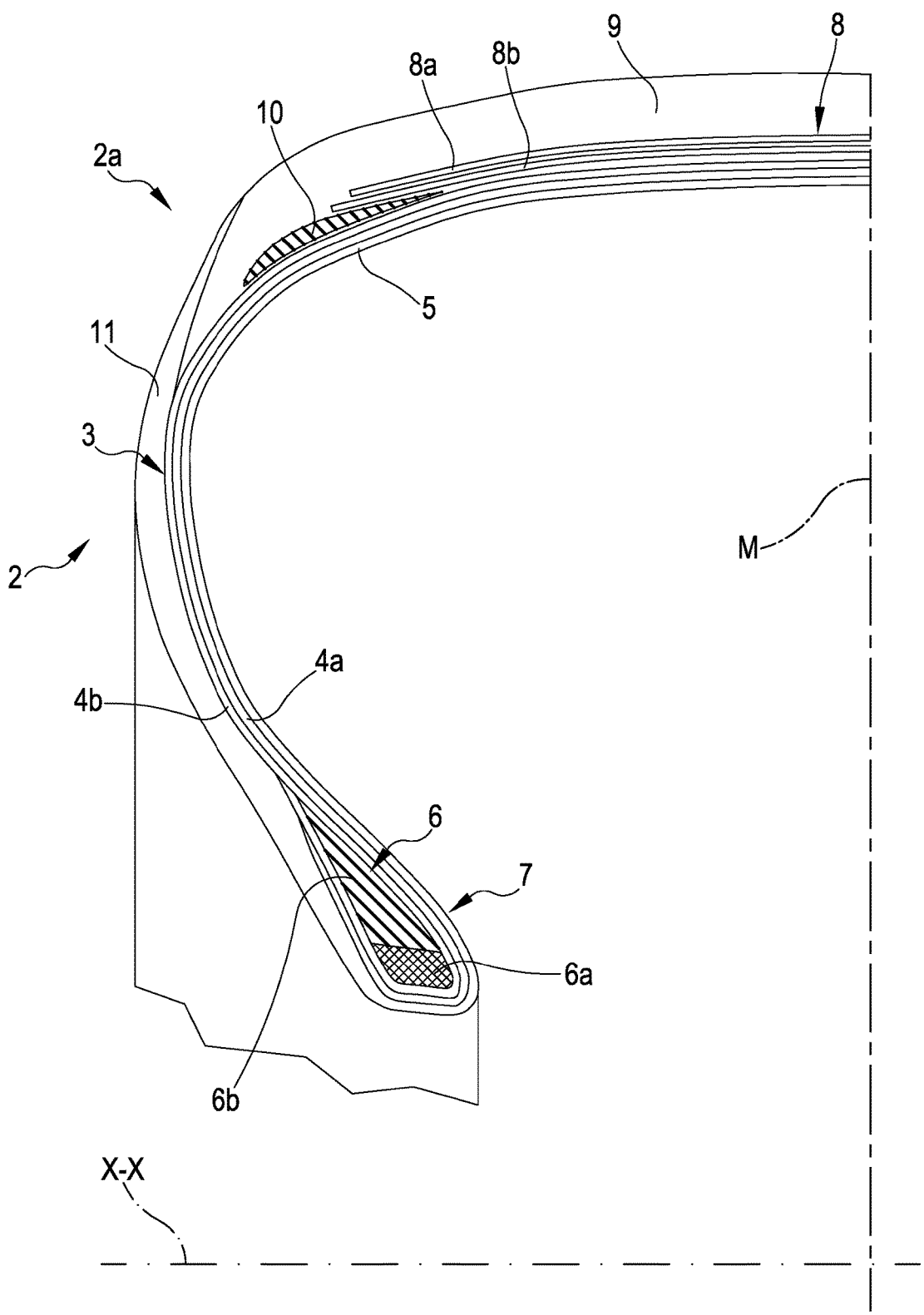
FIG. 9 shows a radial half-section of a tyre built with the plant of FIG. 1.

A tyre 2 made in said plant is illustrated in FIG. 9 and essentially comprises a carcass structure 3 having two carcass plies 4a, 4b. A layer of impermeable elastomeric material or so-called liner 5 is applied inside the carcass ply/plies 4a, 4b. Two anchoring annular structures 6, each comprising a so-called bead core 6a carrying an elastomeric filler 6b in radially external position, are engaged with respective end flaps of the carcass ply/plies 4a, 4b. The anchoring annular structures 6 are integrated in proximity to zones normally identified with the term "beads" 7, at which the engagement between the tyre 2 and a respective mounting rim normally occurs. A belt structure 8 comprising belt layers 8a, 8b is circumferentially applied around the carcass ply/plies 4a, 4b, and a tread band 9 is circumferentially superimposed on the belt structure 8. The belt structure 8 can be associated with so-called "under-belt inserts" 10, each situated between the carcass ply/plies 4a, 4b and one of the axially opposite terminal edges of the belt structure 8. Two sidewalls 11, each from the corresponding bead 7 to a corresponding lateral edge of the tread band 9, are applied in laterally opposite positions on the carcass plies 4a, 4b. The portion comprised between the radially external portion of each sidewall 11 and the axially external portion of the tread band 9 is known as the shoulder of the tyre.

The tyre 2 has a middle line plane "M" (FIG. 9) equidistant from the respective beads 7 and perpendicular to the main rotation axis "X-X" thereof, when the tyre is in service. The middle line plane "M" divides the tyre 2 into a first axial half 2a and into a second axial half 2b that are substantially mirrored with respect to each other (except for the tread design, which might not be symmetrical with respect to the aforesaid middle line axis "M").

The plant 1 illustrated in FIG. 1 comprises a tyre 2 production line 12 formed by an apparatus 13 for building green tyres and at least one moulding and vulcanisation unit 14 operatively arranged downstream of the building apparatus 13.

In the non-limiting embodiment of the plant 1 illustrated in FIG. 1, the building apparatus 13 comprises a carcass building line 15, at which forming drums, not illustrated, are moved between different semifinished product supply stations arranged to form, on each forming drum, a carcass sleeve comprising the carcass plies 4a, 4b, the liner 5, the anchoring annular structures and possibly at least one part of the sidewalls 11.

Simultaneously, in an external sleeve building line 16, one or more auxiliary drums, not illustrated, are sequentially moved between different work stations arranged to form, on each auxiliary drum, an external sleeve comprising at least the belt structure 8, the tread band 9, and possibly at least one part of the sidewalls 11.

The building apparatus 13 also comprises an assembly station 17, at which the external sleeve is coupled to the carcass sleeve.

In other embodiments of the plant 1, not illustrated, the building apparatus 13 can be of different type, for example arranged to form all the aforesaid components on a single drum.

The built tyres 2 are finally transferred to the moulding and vulcanisation unit 14.

From the production line 12, in particular, from the moulding and vulcanisation unit 14, the finished tyres 2 exit sequentially, one after the other, with a predefined frequency and a corresponding predefined production cycle time "Tcp".

Preferably downstream of the production line 12, the plant 1 comprises an apparatus 18 for controlling tyres configured for executing the control of said tyres 2 after the moulding and vulcanisation.

The plant 1 may comprise, in combination or alternatively, the same apparatus 18 for controlling tyres, configured for executing the control of said tyres 2 at the end of the building and before the moulding and vulcanisation step.

Figure 2:
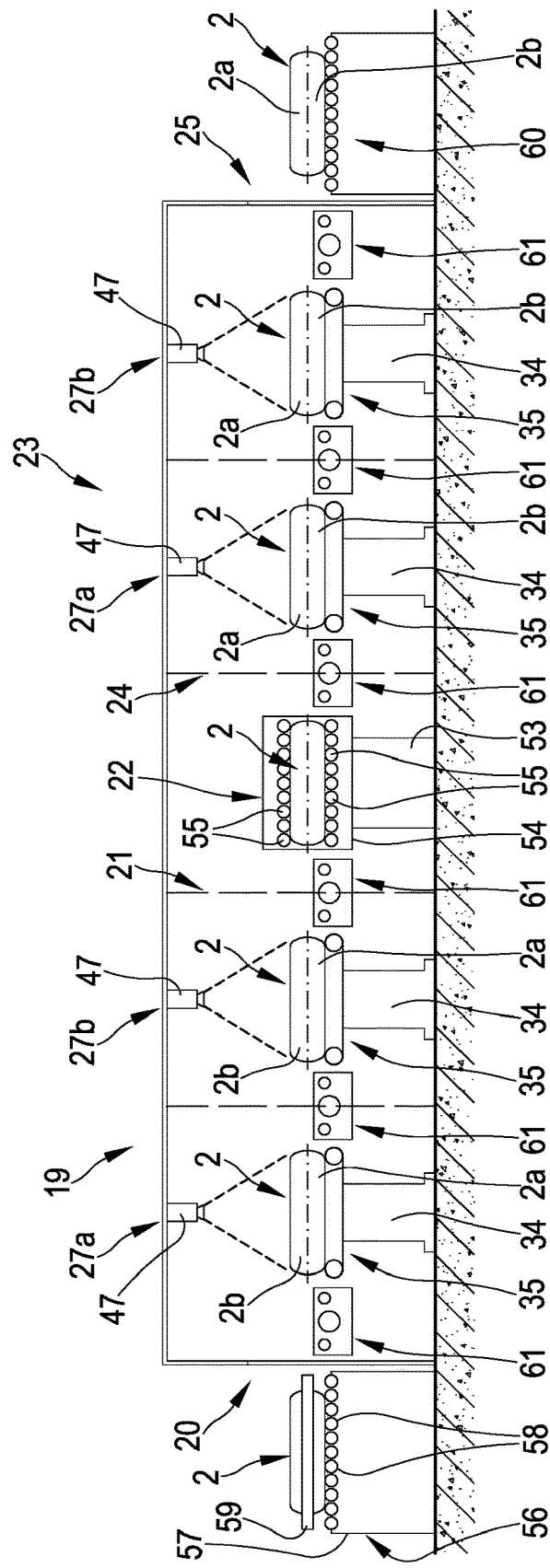
FIG. 2 illustrates an elevation side view of an apparatus for controlling tyres belonging to the plant of FIG. 1.
Figure 3:
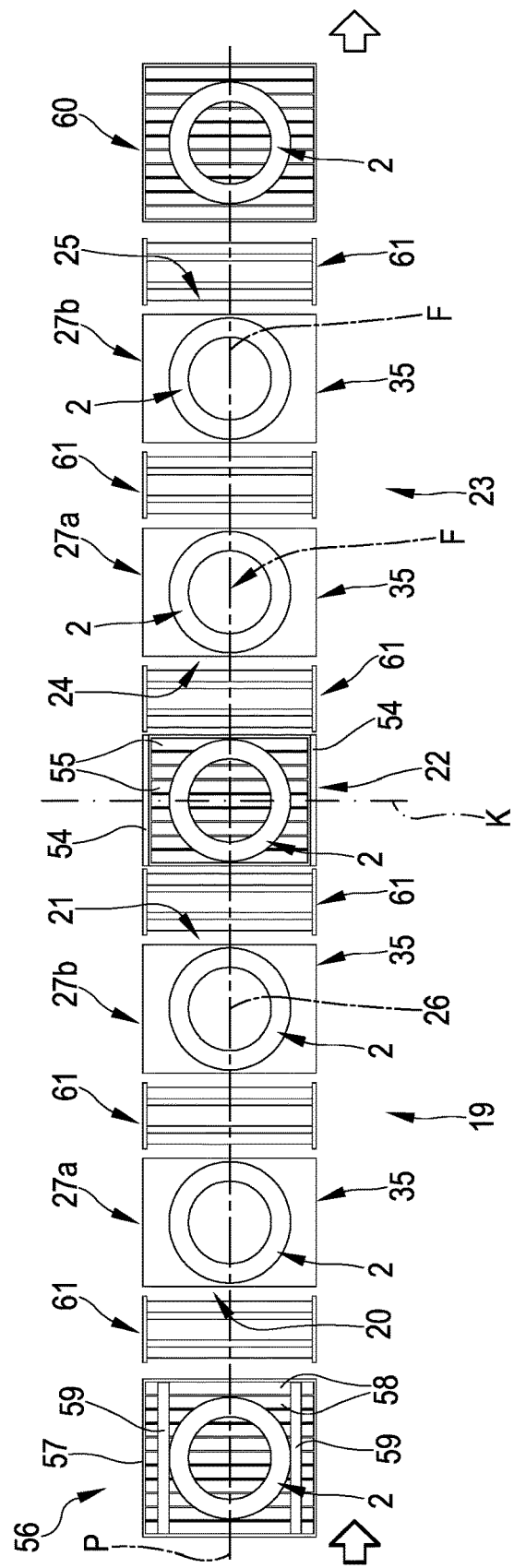
FIG. 3 illustrates a plan view of the apparatus of FIG. 2.

In the embodiments of FIGS. 1, 2 and 3, such apparatus 18 for the control of the tyres, placed downstream of the moulding and vulcanisation unit 14, comprises a first control unit 19 which has an inlet 20 for the finished tyres 2 to be controlled which come from the production line 12 and a respective outlet 21. Downstream of the first control unit 19, at the outlet 21 of said first control unit 19, a transport and overturning device 22 is situated. Downstream of the transport and overturning device 22, a second control unit 23 is positioned, which has an inlet 24 for the finished tyres 2 that come from the transport and overturning device 22 and a respective outlet 25. The inlet 20 of the first control unit 19 constitutes the inlet of the apparatus 18 for controlling tyres. The outlet 25 of the second control unit 23 constitutes the outlet of the apparatus 18 for controlling tyres. The tyres 2 to be controlled enter one after the other in sequence into the inlet 20, travel in sequence along a control path 26 within the apparatus 18 for controlling tyres and exit towards the outlet 25. Along the control path 26, the tyres 2 are subjected to quality controls in order to verify the possible presence of defects, according to modes that will be described in detail hereinbelow.

In the above-described embodiment, the first control unit 19 and the second control unit 23 each comprise a first control station 27a and a second control station 27b placed in sequence after each other along the control path 26 and along a substantially rectilinear feed direction "F".

In a different, non-limiting embodiment, not illustrated, the first control unit 19 and the second control unit 23 each comprise a first control station, a second control station and a third control station, also placed in sequence one after the other along the control path 26 and along a substantially rectilinear feed direction "F".

In a non-illustrated embodiment variant, the first control unit 19 and the second control unit 23 are angled with respect to each to define two rectilinear sections of the control path 26.

In a further embodiment variant, not illustrated, the first control unit 19 and the second control unit 23 are mutually superimposed. The second control unit 23 is placed above the first control unit 19 and the transport and overturning device 22 is placed at terminal ends of said first control unit 19 and second control unit 23. Said transport and overturning device 22 is also configured for lifting the tyres 2 in a manner so as to bring them from the first control unit 19 to the second control unit 23.

A further embodiment variant of the apparatus 18 for controlling tyres, not illustrated, comprises a single control unit which carries out the function of the first and the second control unit 19, 23 described above, and the transport and overturning device 22. Said single control unit comprises the two control stations 27a, 27b placed in sequence and described above in detail. The apparatus 18 for controlling tyres may also comprise auxiliary transport devices, e.g. further conveyor belts, operatively interposed between the outlet of said single control station and the inlet thereof. The auxiliary transport devices are configured for transporting the tyres 2 exiting from the single control station once again to the inlet thereof.

Each of the abovementioned control stations 27a, 27b comprises (FIG. 4 which illustrates the first control station 27a) a frame 28 having a lower portion 29 configured for being abutted against the ground and an upper portion 30 which is extended above the lower portion 29. The illustrated frame 28 is a framework formed by four vertical uprights 31 arranged, in plain view, at the vertices of a square or rectangle. The vertical uprights 31 are at the upper part connected, at the upper portion 30, by a pair of upper longitudinal crosspieces 32a (oriented parallel to the control path 26) and by a plurality of upper transverse crosspieces 32b (oriented perpendicular to the control path 26).

The same vertical uprights 31 are on the lower part connected, at the lower portion 29, by a plurality of lower longitudinal crosspieces 33a and by a plurality of lower transverse crosspieces 33b.

Figure 5:
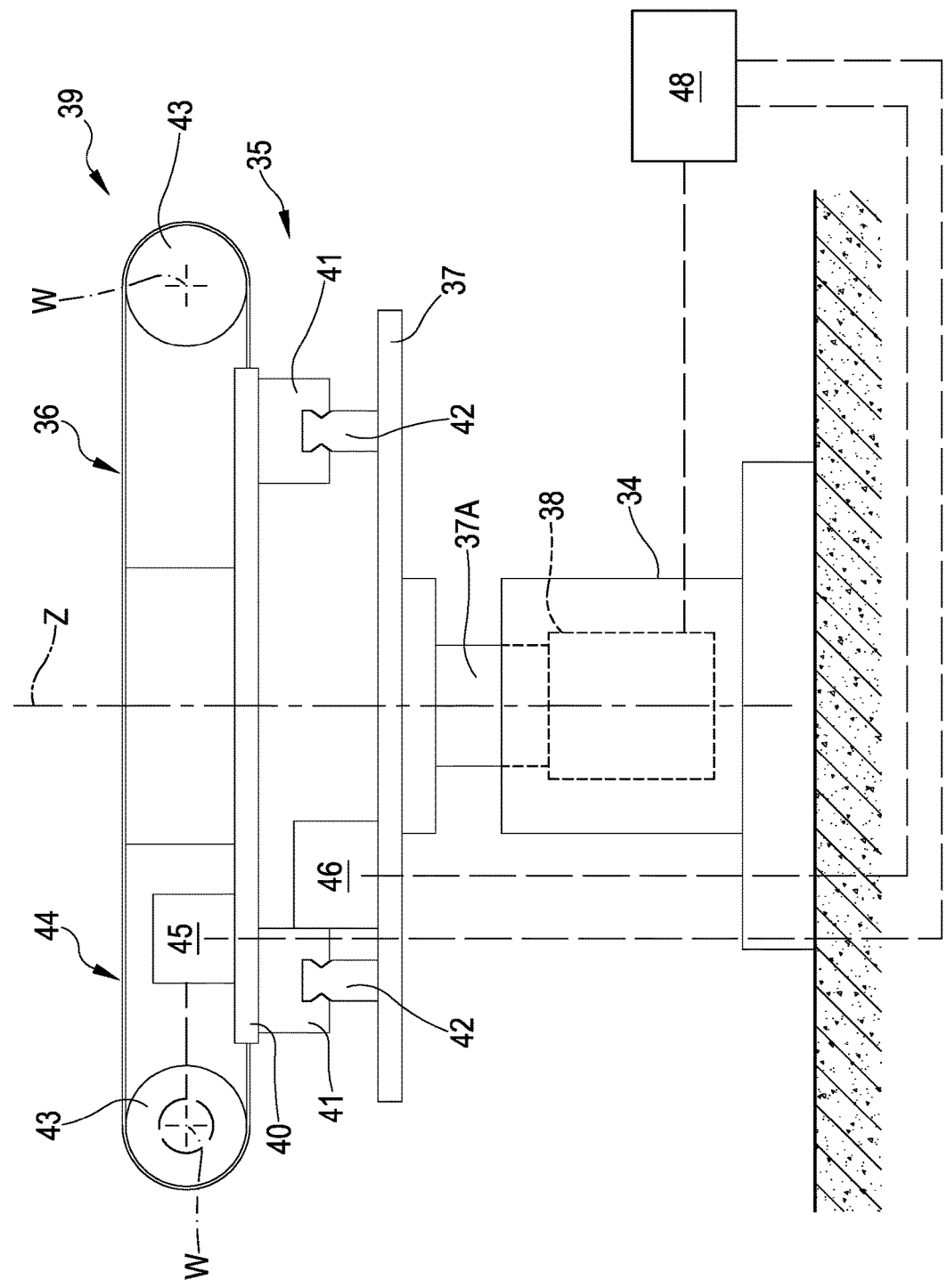
FIG. 5 illustrates an element of the component of FIG. 4.
Figure 6:
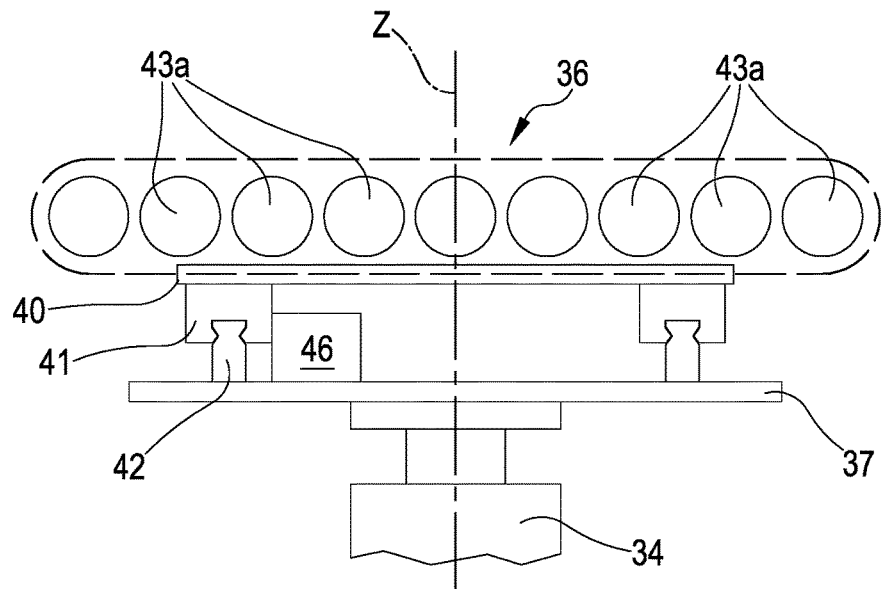
FIG. 6 is a variant of the element of FIG. 5.

Inside the framework, a base 34 is housed that is abutted against the ground (as illustrated in FIGS. 5 and 6) or supported by the lower crosspieces 33a, 33b. A rotating table 35 is mounted on the base 34, so as to be able to rotate around a vertical rotation axis "Z". The rotating table 35 has a substantially horizontal abutment portion 36 configured for receiving and supporting a sidewall 11 of the finished tyre 2 to be controlled.

In accordance with the illustrated embodiment, the rotating table 35 comprises a rotating support 37 placed above the base 34 and rotatably coupled to the base 34 around said vertical rotation axis "Z". The rotating support 37 is integral with a shaft 37A exiting from the base 34. The shaft 37A is connected to a movement device 38 (schematically illustrated in FIG. 5) installed in the base 34 and configured for rotating the rotating table 35 around said vertical rotation axis "Z". The vertical rotation axis "Z" is fixed with respect to the base 34 and with respect to the ground. An endless conveyor 39 is mounted on the rotating support 37. In particular, the endless conveyor 39 comprises a slide 40 defined by a plate provided with a pair of sliding blocks 41 placed on a lower face thereof. Each of the sliding blocks 41 is slidably engaged with a respective guide 42 mounted on an upper face of the rotating support 37.

The slide 40 carries, on an upper face thereof, a pair of rollers 43 pivoted on brackets (not illustrated) and integral with the slide 40. The rollers 43 are movable in rotation around respective revolution axes "W" that are parallel to each other and parallel to the guides 42. A conveyor belt 44 is wound on the pair of rollers 43 to define a closed path and has an upper branch whose upper surface defines said abutment portion 36, which therefore lies substantially in a horizontal plane.

A first actuator 45, schematically illustrated in FIG. 5, is mounted on the slide and is operatively connected to at least one of the two rollers of the pair 43 in order to rotate it and make the conveyor belt 44 move along the closed path. The rollers 43 can be made to rotate in one rotation sense or in the opposite sense in order to generate the translation of the upper branch and of the abutment portion 36 in a first direction "x", in one sense or in the sense opposite thereto.

A second actuator 46, schematically illustrated in FIG. 5, is mounted between the slide and the rotating support 37 and is configured for moving the slide 40 on the guides 42 along a second direction "y" perpendicular to the first direction "x". The abutment portion 36 is therefore movable in the horizontal plane according to said two directions "x, y" with respect to the vertical rotation axis "Z" which instead is fixed with respect to said abutment portion 36. The movement of the abutment portion 36 along the first direction "x" can be continuous and endless. The movement of the abutment portion 36 along the second direction is limited by the available stroke provided by the system constituted by the sliding blocks 41 and by the guides 42.

In a different embodiment, not illustrated, in place of the conveyor belt 44, the endless conveyor 39 comprises a plurality of powered rollers 43a that are parallel to each other and mounted on the rotating support 37. In this case, the whole of the upper surfaces of said powered rollers 43a defines said abutment portion 36.

A detection device 47 of optical type (schematically illustrated in FIGS. 2 and 4) is installed above the rotating table 35 and faces towards the abutment portion 36. The detection device 47 is, for example, provided with one or more cameras and with a plurality of illuminators placed inside the control station 27a, 27b. In the illustrated embodiment, the detection device 47 is mounted on one of the upper transverse crosspieces 32b.

An electronic management unit 48 (FIGS. 4 and 5) is operatively connected to the detection device 47, to the movement device 38, to the first actuator 45 and to the second actuator 46. The electronic management unit 48 is configured for detecting a shift "S" between the vertical rotation axis "Z" of the rotating table 35 and the main axis "X-X" of the tyre 2 placed on the abutment portion 36 and for driving the first and the second actuator 45, 46 and moving the abutment portion 36 according to the first "x" and/or second direction "y" as a function of the detected shift "S" in order to render such shift less than a pre-established value, for example equal to or less than about 0.1 mm.

Figure 4:
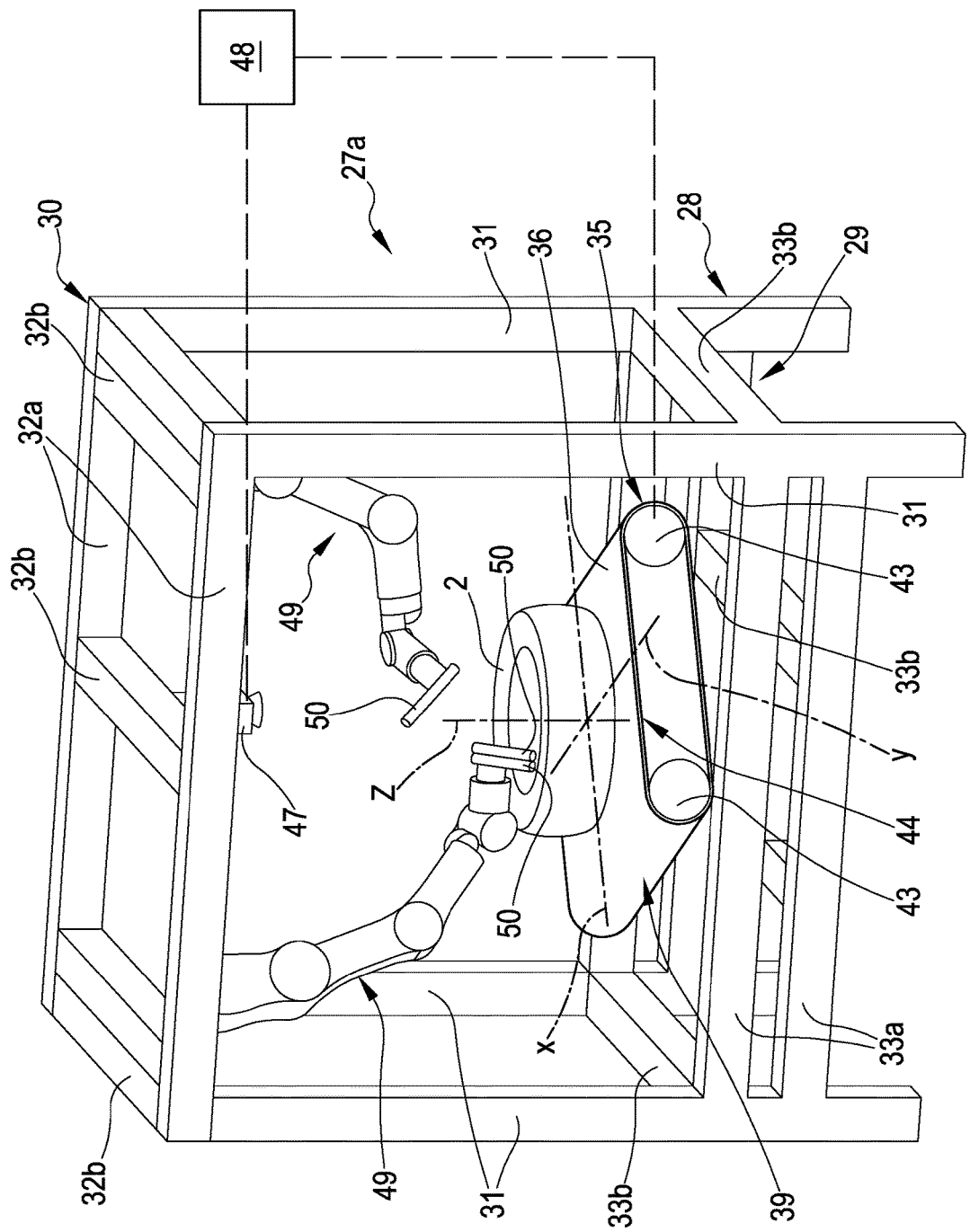
FIG. 4 illustrates a perspective view of a component of the apparatus of the preceding figures.

Each of the abovementioned control stations 27a, 27b comprises two anthropomorphic robotic arms 49 mounted above the rotating table 35 and constrained to the upper transverse crosspieces 32b (FIG. 4). Each of the abovementioned anthropomorphic robotic arms 49 has a base portion thereof joined to the transverse upper crosspieces 32b and a series of elements arranged consecutively, starting from the base portion, and connected by joints. The anthropomorphic robotic arms 49 have for example six or seven axes/degrees of freedom. Each anthropomorphic robotic arm 49 is projectingly extended from the upper transverse crosspieces 32b above the abutment portion 36.

A terminal end of each anthropomorphic robotic arm 49 carries one or more devices or control tools 50. Between the abutment portion 36 and the abovementioned upper transverse crosspieces 32b, the frame 28 delimits a maneuvering space for the anthropomorphic robotic arms 49 and for the control tools 50. The anthropomorphic robotic arms 49 define support and movement devices for the tools 50. The tools carried by the anthropomorphic robotic arms 49 are for example capable of executing a series of non-destructive control operations which allow detecting possible external defects (on the radially external and/or radially internal surface) and/or internal defects (in the structure) of the tyre. Said controls can for example be of optical type (photography, shearography, holography, radiography, etc.), ultrasonic type, mechanical type or a combination thereof. The tools 50 are operatively active above the rotating table 35.

By way of a non-exhaustive example, the tools can comprise digital cameras with possible light sources with diffused, grazing or direct light, e.g. of laser type, configured for filming two-dimensional and/or three-dimensional images of the surface of the tyres.

The transport and overturning device 22 comprises (FIGS. 1, 2 and 3) a respective frame 53 configured for abutting against the ground. The frame 53 carries hinged thereto, around overturning pins defining a horizontal overturning axis "K", a pair of parallel and spaced lateral walls 54. Between the walls 54, two series of transport rollers 55 are extended, rotatably coupled to said walls 54. Each series comprises a plurality of parallel, horizontal transport rollers 55 lying on a same plane, in a manner so as to define a support with a movable transport surface for a tyre 2. The two series of the abovementioned transport rollers 55 are mutually spaced and a seat is delimited therebetween for receiving a tyre 2 to be overturned. The seat has opposite openings in order to allow the transit of the tyre 2, as detailed hereinbelow. One or both openings of the space are selectively closed by a stop element, e.g. a kind of gate, movable between a closed position and an open position. A motor, not illustrated, is operatively connected to the lateral walls 54 in order to rotate the assembly formed by the walls themselves 54 and by the transport rollers 55 around the overturning axis "K". Said assembly formed by the lateral walls 54 and by the transport rollers 55 is movable around said overturning axis "K" between a first position, in which the transport rollers 55 of one series are placed below and parallel to the ground, and a second position, in which the transport rollers 55 of the other series are placed on the lower part. When in the seat, the tyre 2 lies abutted against the sidewall 11 on the series of transport rollers 55 that is situated below. A further motor, not illustrated, is operatively connected to at least some of the transport rollers 55 in order to make them rotate and thus translate the tyre 2 that lies in contact thereof. The stop element serves to prevent the tyre 2 from falling outside the transport and overturning device 22, during overturning. In the embodiment of FIGS. 1, 2 and 3, the transport and overturning device 22 is situated between the second control station 27b belonging to the first control unit 19 and the first control station 27a belonging to the second control unit 23. The overturning axis "K" is perpendicular to the control path 26 and, in the first or second position, the transport rollers 55 of the series placed below are substantially situated at the same height of the abutment portion 36 of the second control station 27b belonging to the first control unit 19 and of the first control station 27a belonging to the second control unit 23.

Upstream of the first station 27a of the first control unit 19, a mechanical centering support 56 is situated, comprising a roller unit on which the tyre 2 is positioned before feeding it to the first station 27a. In particular, the mechanical centering support 56 comprises a frame 57 abutted against the ground and a plurality of rollers 58 rotatably mounted on the frame 57. The mechanical centering support 56 also comprises a pair of lateral sides 59 placed on opposite sides with respect to the control path 26. The sides 59 are mechanically constrained so as to be symmetrically moved close to or away from each other and to/from a middle line axis "P" of the mechanical centering support 56. The tyre 2 is abutted against the roller unit and placed between said sides 59 which, by abutting against opposite portions of the tyre, laterally pre-centre it, as will be detailed hereinbelow.

Downstream of the second station of the second control unit 23, an outlet roller unit 60 is placed.

Between the mechanical centering support 56 and the first station 27a of the first control unit 19, between successive control stations 27a, 27b of the first control unit 19 and the second control unit 23, between the transport and overturning device 22 and the control stations 27b of the first control unit 19 and 27a of the second control unit 23 adjacent thereto and between the second station 27b of the second control unit 23 and the outlet roller unit 60, respective transfer groups 61 are placed that are configured for supporting at least one portion of the sidewall 11 of the tyre 2 during its passage from one control station 27a to a subsequent station 27b (or from one control station 27b to the transport and overturning device 22 or from the transport and overturning device to the control station 27a or from the control station 27b to the roller unit 60) and therefore preventing the fall thereof.

Each transfer group 61 comprises (FIGS. 7 and 8A, 8B, 8C) a powered transfer roller 62 having a respective rotation axis parallel to the rotation axes of the rollers 58 of the mechanical centering support 56. Each transfer group 61 could also comprise two auxiliary transfer rollers 63 respectively placed downstream and upstream of the powered transfer roller 62 and parallel to the latter. The powered transfer roller 62 is connected to a respective motor 64, schematically illustrated, configured for rotating it. The two auxiliary transfer rollers 63 are preferably idle. The two auxiliary transfer rollers 63 are also movable, by means of a third actuator 65, along a vertical direction between a work position and a rest position. In the work position (illustrated with solid line in FIG. 7), the two auxiliary transfer rollers 63 lie in a raised position and are substantially placed at the height of the powered transfer roller 62 and of the abutment portion 36. In the rest position (illustrated with a dashed line in FIG. 7), the two auxiliary transfer rollers 63 lie in a lowered position and are placed below the powered transfer roller 62 and the abutment portion 36. In the raised position, they provide a support for the moving tyre 2. In the lowered position, they leave enough space around the adjacent rotating table 35 to allow the table to rotate without obstruction around its vertical rotation axis "Z".

The above-described electronic management unit 48 is operatively connected to the anthropomorphic robotic arms 49 of the first control unit 19 and of the second control unit 23, to the control tools 50, to the movement devices 38, to the first actuators 45, to the second actuators 46, to the motors 64, to the third actuators 65, and to the non-illustrated motors of the transport and overturning device 22. Said electronic management unit may be the same electronic management unit of the entire plant 1 or it may be operatively connected to one or more other units dedicated to other parts of the plant 1. The electronic management unit manages the operation of the apparatus 18 for controlling tyres in coordination with the production line 12 placed upstream.

During use and in accordance with the method for controlling tyres according to the present invention (and with reference to FIGS. 1, 2 and 3), each time a finished tyre 2 exits from the vulcanisation unit 14, it is transferred, for example through a conveyor (not illustrated), onto the mechanical centering support 56. Here the lateral sides 59 interact with the tyre 2 and they laterally pre-centre it, such that the main rotation axis "X-X" of said tyre 2 lies at least in proximity to the middle line axis "P", with a lateral shift "Sy" less than 20-25 mm (pre-centering along the second direction "y").

Figure 7:
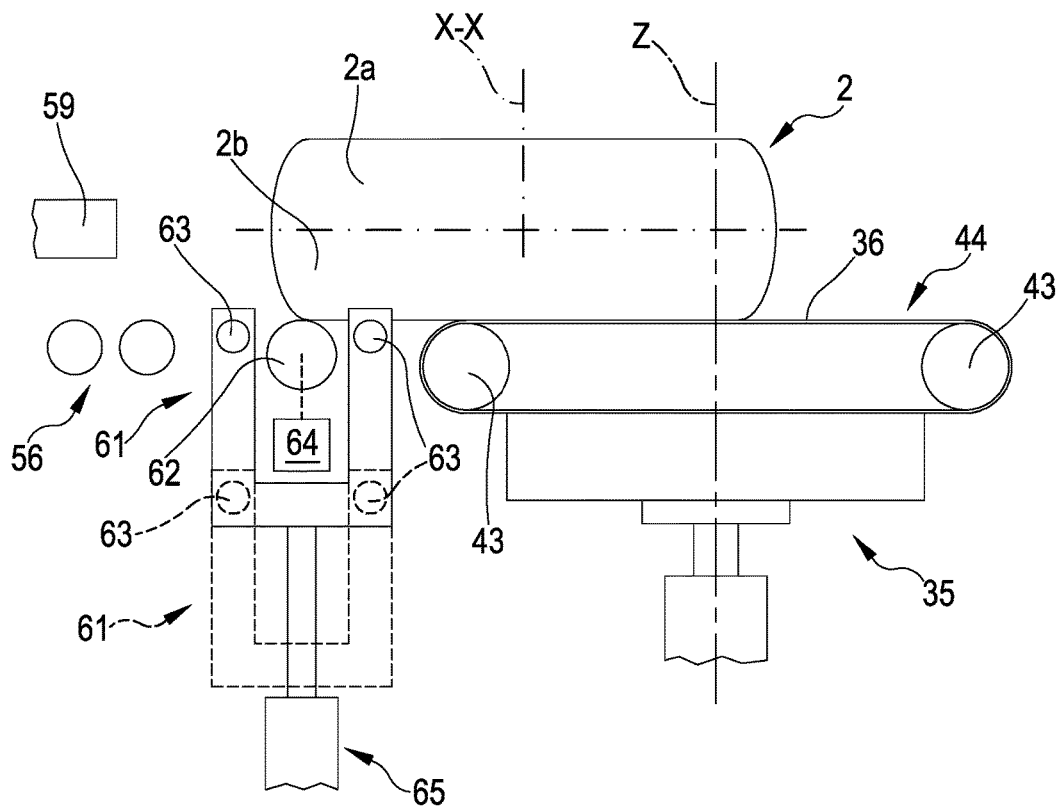
FIG. 7 is an enlargement of a portion of the apparatus of FIG. 2.
Figure 8A:
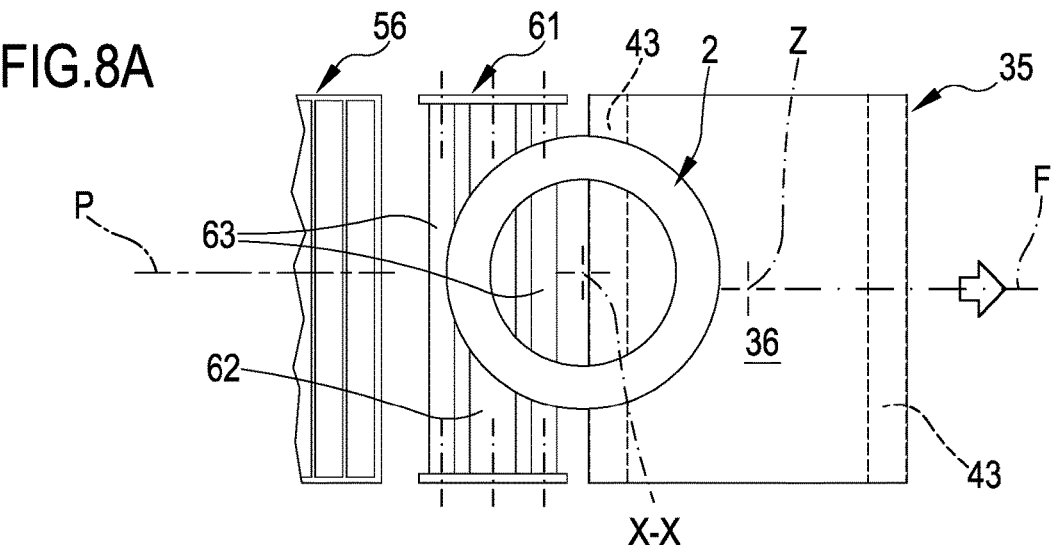
FIGS. 8A, 8B, 8C illustrate a top view of the portion of FIG. 7 in respective operative conditions.

The tyre 2 is then fed into the first control station 27a of the first control unit 19 while the two auxiliary transfer rollers 63 lie in the raised position and the tyre 2 slides in abutment thereon (FIGS. 7 and 8A). The tyre 2 not mounted on a rim (hence deflated) is abutted with a sidewall 11 against the upper branch of the respective conveyor belt 36. The abutment portion 36 is oriented such that the first direction "x" thereof coincides with the feed direction "F". The tyre 2 abutted against the sidewall 11 has its axial second half 2b adjacent to the abutment portion 36 and the axial first half 2a directed upward.

The abutment against the sidewall 11 ensures that the form of the tyre 2 is always the same during all the tests, without having to inflate the tyre 2. The tyre 2 at rest (deflated) reduces the vibrations of the same with respect to an inflated tyre and improves the quality of the controls, in particular of the obtained images. The abutment against the sidewall avoids considerable mechanical stresses that could compromise the integrity thereof and the quality of the controls. The abutment against the sidewall also allows an easy centering with respect to the reference system of the controls, as described hereinbelow.

Figure 8B:
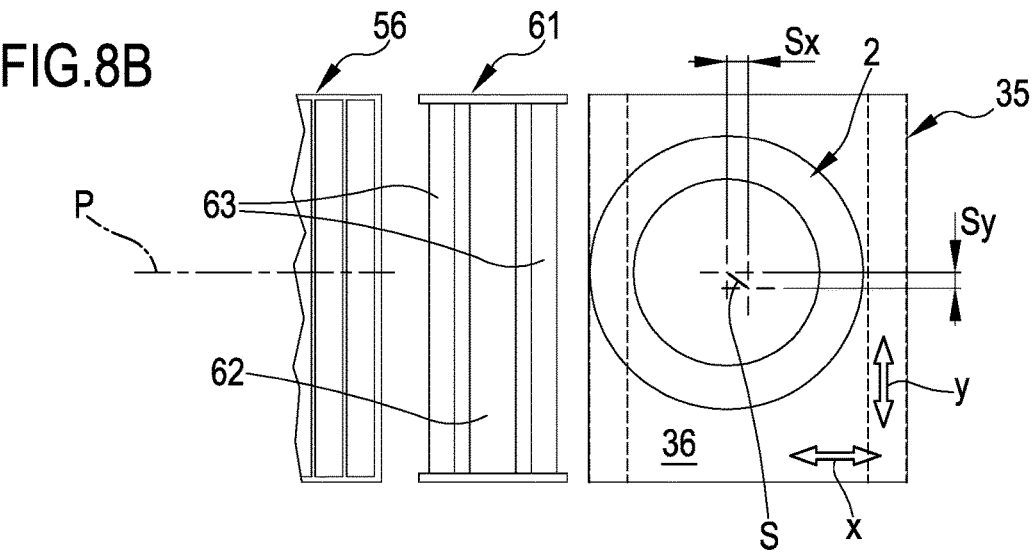

The electronic management unit 48 knows the size of the apparatus 18 and of the entering tyre 2, it drives the first actuator 45 when, by means of an opportune calculation, it deems that the main rotation axis "X-X" of the tyre 2 is more or less placed at the rotation axis "Z" of the rotating table 35, with a longitudinal shift "Sx" less than 20-25 mm (pre-centering along the first direction "x"). The conveyor belt 44 is temporarily stopped (FIG. 8B). By way of example, if Sx=15 mm and Sy=20 mm, then S=25 mm.

At this point, the apparatus 18 provides for actual fine centering of the tyre 2. Since the tyres 2 are not perfectly circular, the main rotation axis of each tyre 2 is first calculated by means of suitable algorithms, not described herein. For example, the detection device 47 detects the position of multiple points of the tyre and the electronic management unit 48 calculates a virtual main rotation axis "X-X".

The detection device 47 then detects the shift "S" present between the vertical rotation axis "Z" of the rotating table 35 and the main rotation axis "X-X" of the tyre 2 and sends, to the electronic management unit 48, signals indicative of said shift "S". Due to the pre-centering, such shift "S" is usually less than about 25 mm.

Figure 8C:
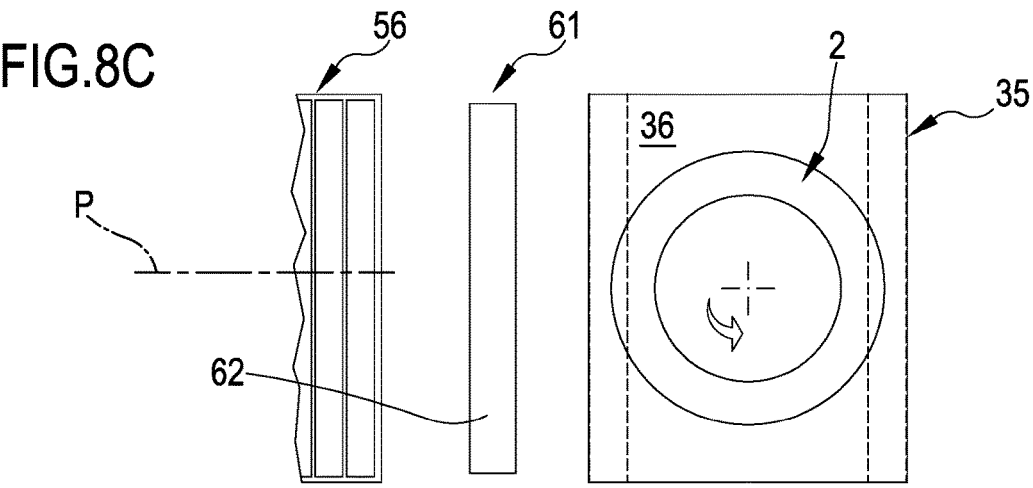

The electronic management unit 48 drives the first actuator 45 and/or the second actuator 46 and moves the abutment portion 36 until said shift "S" is reduced below a pre-established value, e.g. about 0.1 mm, substantially cancelling said shift (FIG. 8C). The electronic management unit 48 continues to receive the signals indicative of said shift "S" as the abutment portion 36 is moved and continues to drive the first actuator 45 and/or the second actuator 46 until the desired centering is obtained. The centering routine has a duration "Tcent", e.g. of about 2 s. The maximum fine centering movement managed by the electronic management unit 48 is smaller than about 25 mm. If the above-indicated value of the shift "S" is not attained, the procedure is repeated according to an identical cycle. In such a manner, even if there is an initial shift "S" greater than 25 mm, it is possible to centre the tyre 2 according to the desired tolerance values.

Finally, once centred, the tyre 2 has its rotation axis "X-X" substantially coinciding with the vertical rotation axis "Z"; in such situation, the anthropomorphic robotic arms 49 can always be positioned in the assigned positions as a function of the size of the same tyre 2.

Subsequently, the anthropomorphic robotic arms 49 are moved into the maneuvering space until the respective control tools 50 are brought to the tyre 2.

The two auxiliary transfer rollers 63 of the transfer groups 61 placed upstream and downstream of the rotating table 35 are brought into lowered position and, keeping the control tools 50 in fixed position, the rotating table 35 and the tyre 2 are rotated around the vertical rotation axis "Z" (FIGS. 4 and 8C). During such rotation, the tools 50 provide for executing a cycle of controls on the axial first half 2a of the tyre 2. Such controls can be executed in successive cycles and at each cycle, the control tools 50 of the same control station 27a, 27b are placed in different positions in order to control different portions of the same tyre 2.

Once the control cycles have terminated, the rotation of the rotating table 35 is stopped with the first direction "x" aligned with the feed direction "F" and the anthropomorphic robotic arms 49 are moved away from the tyre 2. The two auxiliary transfer rollers 63 of the transfer groups 61 placed upstream and downstream of the rotating table 35 are brought into the raised position. The conveyor belt 44 of the first control station 27a, on which the tyre 2 lies, is moved together with the conveyor belt 44 of the second control station 27b and together with the powered transport rollers 62, until the tyre 2, always abutted against the same sidewall 11, is made to complete a pitch along control path 26 and to bring the tyre 2 onto the portion 36 of said second control station 27b. The tyre 2 is then unloaded from the first control station 27a and loaded into the second control station 27b.

During loading, the pre-centering is executed along the first direction "x", as already described above with reference to the first control station 27a, and after loading the actual fine centering is executed (according to the same modes described above) with respect to the rotation axis "Z" of the second control station 27b.

The tyre 2 remains in the second control station 27b always with its axial first half 2a directed upward and other control cycles are executed with modes analogous that described for the first control station 27a.

In the first control unit 19 and along a first part of the control path 26 defined by said first unit 19, the axial first half 2a of the tyre 2 is subjected to a plurality of controls. Such controls preferably cover the entire surface (internal and external) of the axial first half 2a.

Such controls can be of optical type (e.g. photography, shearography, holography, radiography, etc.), ultrasonic type, mechanical type or a combination thereof.

At this point, the rotation of the tyre 2 is stopped and the conveyor belt 44 of the second control station 27b, on which the tyre 2 lies, is moved together with the powered transfer roller 62 placed downstream and with the transport rollers 55 of the transport and overturning device 22 (placed in raised position) until the tyre 2, always abutted against the same sidewall 11, is made to complete a pitch along the control path 26 and to bring the tyre 2 substantially to the centre of the transport and overturning device 22.

The assembly formed by the lateral walls 54, by the transport rollers 55 and by the tyre 2 is overturned 180° around the overturning axis "K". Such overturning axis "K" belongs to an axial middle line plane of said tyre 2 that is perpendicular to said main rotation axis "Z". The axial first half 2a of the tyre 2 situated above now lies downward with the respective sidewall 11 abutted against the transport rollers 55. The axial second half 2b of the tyre 2 that was situated below is now directed upward.

Subsequently, by driving the transport rollers 55 and the conveyor belt 44 of the first control station 27a belonging to the second control unit 23, the tyre 2 is transferred into said second control unit 23 where the second half 2b thereof is subjected to controls that are similar—preferably identical—regarding type and number to those of the axial first half 2a, along a second part of the control path 26, with the modes as described above for said axial first half 2a (pre-centering, fine centering, control, unloading).

At the outlet of the second control unit 23, when the tyre 2 is fed onto the outlet roller unit 60, both axial halves 2a, 2b of the tyre 2 have been accurately controlled.

In operating conditions, each control station 27a, 27b, both of the first and second control unit 19, 23, and the transport and overturning device 22 houses a tyre 2 that exited in sequence from the vulcanisation unit 14. Said tyres 2 are simultaneously advanced, step-by-step, along the control path 26 from one control station to the other 27a, 27b or to the transport and overturning device 22 (termed "walking beam" movement). Between subsequent steps, said tyres 2 remain in the respective control stations 27a, 27b in the transport and overturning device 22 for the same time.

This signifies that each control cycle time "Tcc" one tyre 2 enters into the apparatus 18 for controlling tyres and one tyre 2 exits from said apparatus 18. Said control cycle time "Tcc" can be made substantially equal to the production cycle time "Tcp", so that the production line 12 can be synchronized with the apparatus 18 for controlling tyres. Each tyre 2 exiting from the production line 12 can therefore enter directly into the apparatus 18 for controlling tyres without requiring intermediate compensation zones (buffers).

The invention claimed is:

1. An apparatus for controlling tyres, each tyre having a main rotation axis, comprising at least one control station, wherein said at least one control station comprises:
   a base;
   a rotating table mounted on the base so as to be able to rotate around a respective vertical rotation axis, wherein the rotating table comprises an abutment portion lying in a plane substantially horizontal and perpendicular to said vertical rotation axis and configured for receiving and supporting a sidewall of a tyre to be controlled, and wherein the abutment portion is movable in said plane that is substantially horizontal with respect to the vertical rotation axis according to two directions belonging to said substantially horizontal plane;
   at least one control device operatively active at the rotating table;
   a movement device configured for rotating the rotating table around said vertical rotation axis;
   at least one actuator operatively connected to the abutment portion in order to move said abutment portion according to said two directions;
   a detection device configured for detecting a shift on said substantially horizontal plane between the vertical rotation axis and the main axis of the tyre; and
   an electronic management unit operatively connected to the detection device and to said at least one actuator, wherein the electronic management unit is configured for driving the actuator and moving the abutment portion according to at least one of said two directions as a function of the detected shift, in order to render such shift less than a pre-established value.

2. The apparatus as claimed in claim 1, wherein the electronic management unit is configured for centering the tyre with respect to the rotation axis, substantially cancelling said shift.

3. The apparatus as claimed in claim 1, wherein the detection device is an optical type.

4. The apparatus as claimed in claim 1, wherein the rotating table comprises an endless conveyor movable along a first direction of said two directions and carrying said abutment portion, wherein said endless conveyor is also movable for a predefined travel along a second direction of said two directions.

5. The apparatus as claimed in claim 4, wherein the endless conveyor comprises a conveyor belt wound on a pair of rollers, in which an upper surface of the conveyor belt defines the abutment portion.

6. The apparatus as claimed in claim 4, wherein the endless conveyor comprises a plurality of powered rollers, in which the assembly of upper surfaces of said powered rollers defines said abutment portion.

7. The apparatus as claimed in claim 4, wherein the rotating table comprises a rotating support rotatably coupled to the base around said vertical rotation axis, in which the endless conveyor is mounted on the rotating support and is movable with respect to said rotating support along the second direction.

8. The apparatus as claimed in claim 1, comprising a plurality of control stations.

9. The apparatus as claimed in claim 8, wherein, between each control station and a next control station, a transfer group is placed comprising at least one transfer roller.

10. The apparatus as claimed in claim 9, wherein said at least one transfer roller is powered.

11. The apparatus as claimed in claim 9, wherein the transfer group comprises two or more auxiliary transfer rollers respectively placed downstream and upstream of the transfer roller.

12. The apparatus as claimed in claim 9, wherein the transfer group is movable between a work position, in which the transfer group lies between one control unit and a next control unit in order to support a moving tyre, and a rest position, in which the transfer group allows the free rotation of the rotating table(s).

13. The apparatus as claimed in claim 11, wherein the auxiliary transfer rollers are movable between a work position, in which the auxiliary transfer rollers lie between one control unit and a next control unit in order to support a moving tyre, and a rest position, in which the auxiliary transfer rollers allow the free rotation of the rotating table.

14. The apparatus as claimed in claim 12, wherein, in the rest position, the transfer group or the auxiliary transfer rollers is/are arranged in a lower position with respect to the rotating table.

15. A process for controlling tyres, each tyre having a main rotation axis, comprising the steps:
i. feeding a tyre to be controlled onto an abutment portion lying on a substantially horizontal plane, said abutment portion belonging to a respective rotating table having a rotation axis substantially perpendicular to said substantially horizontal plane;
ii. detecting a shift on said substantially horizontal plane present between said rotation axis and the main rotation axis of the tyre fed on said abutment portion;
iii. moving the abutment portion of said rotating table in said substantially horizontal plane with respect to the vertical rotation axis and according to at least one direction until said shift is reduced below a predetermined value;
iv. rotating the rotating table together with the tyre around said vertical rotation axis of the rotating table; and
v. executing controls on said tyre while the rotating table and the tyre are in rotation.

16. The process as claimed in claim 15, wherein, at the end of the execution of said controls, provision is made for:
unloading said tyre from said abutment portion of said rotating table.

17. The process as claimed in claim 15, wherein said predetermined value is smaller than 1 mm.

18. The process as claimed in claim 15, wherein moving the abutment portion of the rotating table comprises: moving said abutment portion according to two directions on said substantially horizontal plane.

19. The process as claimed in claim 18, wherein moving the abutment portion of the rotating table comprises: moving an endless conveyor carrying said abutment portion along a first direction of said two directions.

20. The process as claimed in claim 18, wherein moving the abutment portion of the rotating table comprises: moving the endless conveyor for a predefined travel along a second direction of said two directions.

21. The process as claimed in claim 18, wherein said two directions are orthogonal with respect to each other.

22. The process as claimed in claim 18, wherein feeding the tyre comprises: loading said tyre on the rotating table by moving the abutment portion of said rotating table along a first direction of said two directions until the entire tyre rests on the rotating table.

23. The process as claimed in claim 22, comprising: pre-centering the tyre along a first direction by detecting the passage of the tyre during loading and stopping the movement of the abutment portion along the first direction after a predefined travel.

24. The process as claimed in claim 15, comprising: simultaneously advancing, step-by-step, a plurality of tyres tires along a control path and executing controls on said tyres during time intervals placed between subsequent steps; wherein at each time interval, provision is made to execute steps from ii to v.

25. The process as claimed in claim 24, wherein advancing comprises: supporting each tyres between one rotating table and a next rotating table or between one rotating table and a transport and overturning device by means of a transfer group.

26. The process as claimed in claim 25, comprising: lowering the transfer group before rotating the rotating table in order to allow free rotation of said rotating table.

* * * * *